United States Patent Office 2,779,800
Patented Jan. 29, 1957

2,779,800

PROCESS FOR THE PRODUCTION OF POLY-(HYDROXYARYL)ALKANE COMPOUNDS AND NEW PRODUCTS THEREOF

Roy T. Holm, Orinda, and Curtis W. Smith, Berkeley, Calif., assignors to Shell Development Company, New York, N. Y., a corporation of Delaware No Drawing. Application November 30, 1954,
Serial No. 472,227

16 Claims. (Cl. 260—619)

This invention relates to the synthesis of gem-di(hydroxyaryl) alkanes and substitution products thereof. It deals with a new method for manufacturing compounds of this type and with new gem-di(hydroxyaryl) alkanes containing at least five carbon atoms in the alkane chain and having a hydroxyl group and/or gem-di(hydroxyaryl) groups as substituents on the chain in positions at least five carbon atoms removed from the first said gem-di(hydroxyaryl) groups.

An important object of the invention is the provision of a method for converting alpha,beta-ethylenic ethers, that is, ethers in which the ether oxygen atom is directly attached to a carbon atom which is linked by an ethylenic double bond to another carbon atom, to valuable gem-di(hydroxyaryl)alkane compounds. A special object is the conversion of cyclic alpha,beta-ethylenic ethers to substituted gem-di(hydroxyaryl)alkanes of the above-indicated type. Another object is the production of new alpha,alpha - di(hydroxyaryl) - omega - hydroxyalkanes, alpha,alpha,omega,omega-tetrakis-alkanes, and hydroxy substitution products of the latter. A further special object is the production of compounds of the foregoing types from alpha,beta-ethylenic ethers in the dihydropyran series of compounds. Still another object is the provision of a process for producing gem-di(hydroxyaryl) alkane compounds in an efficient and economical manner. Still other objects and advantages of the invention will become apparent from the following description of the new process and the compounds which can be synthesized thereby.

It has been discovered in accordance with the invention that useful gem-di(hydroxyaryl)alkane compounds can be produced by reacting under controlled conditions an alpha,beta-ethylenic ether with a phenol which has at least one replaceable hydrogen atom attached to the ring to which the phenolic hydroxy group is linked. In this reaction the bond linking the ether oxygen atom to the ethylenic carbon atom is opened and two hydroxyaryl groups corresponding to the phenol used become linked directly by carbon-to-carbon bonds to the carbon atom of the ether thus set free. At the same time a hydrogen atom from the ring of the phenol adds to the adjacent carbon atom so that the ethylenic bond of the ether becomes saturated. Simultaneously, the other carbon atom to which the ether oxygen was attached in the starting ether becomes substituted by a hydroxyl group or by two hydroxyaryl groups depending upon the type of linkages and/or substituents carried by this carbon atom in the alpha,beta-ethylenic ether, as will be pointed out more fully hereinafter.

This reaction is quite unexpected since, to the best of our knowledge, all previous reactions of phenols with alpha,beta-ethylenic ethers have led only to the production of phenolic ether-type products, i. e. products in which the hydrogen atom of the phenolic hydroxy group is replaced by an organic group from the ethylenic ether. Such products have properties which are entirely different from those of the gem-di(hydroxyaryl)alkane compounds obtained by the present new method. It has been discovered that this different type of product can be produced in good yields by carrying out the reaction between an alpha,beta-ethylenic ether and a phenol of the previously described type, in the presence of at least 0.2 mole, and more preferably between about 0.25 and about 1.0 mole, of acid per mole of alpha,beta-ethylenic ether used in the reaction. In this way etherification of the phenol is suppressed and the reaction of the invention is made to predominate.

As previously indicated, gem-di(hydroxyaryl) substitution of the alpha carbon of the starting alpha,beta-ethylenic ether is a characteristic feature of the process of the present invention, but the nature of the substituent group or groups which are formed on the other carbon atom to which the ether oxygen atom is attached will vary depending upon the character of the bonds and/or substituents linked to this carbon atom in the starting ether. To simplify the description of this aspect of the invention, it will first be explained in connection with the reaction of phenols with cyclic alpha,beta-ethylenic ethers. This example has been chosen for purposes of illustration, not only because the nature of the substituents is easier to trace in this case since they will all be linked to the same aliphatic chain, but also because, by the use of ethers of this type having five or more, preferably five to nine, carbon atoms in a ring with the ether oxygen atom as the sole hetero atom, especially valuable new compounds can be produced.

With cyclic alpha,beta-monoethylenic ethers which have only hydrogen atoms and/or non-reactive hydrocarbon groups attached to the saturated carbon atom of the ring to which the ether oxygen atom is directly linked, one obtains gem-di(hydroxyaryl)alkanes which are substituted by a hydroxyl group on the alkane chain which is removed from the gem-di(hydroxyaryl) groups by the same number of carbon atoms as are in the ring of the starting cyclic ether. The reaction is in accordance with the following general equation:

(1)
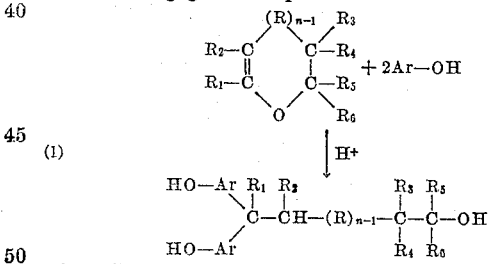

where R represents a non-reactive divalent hydrocarbon radical or nonreactive substituted divalent hydrocarbon radical, $R_1$, $R_2$, $R_3$, $R_4$, $R_5$ and $R_6$ represent hydrogen atoms or non-reactive monovalent hydrocarbon or non-reactive substituted monovalent hydrocarbon radicals, $n$ is a positive whole number having a maximum value of two, and Ar- is an aryl radical of a phenol.

When corresponding cyclic ethers, in which both of the carbon atoms linked to the ether oxygen atom are joined by ethylenic double bonds to their respective adjacent ring carbon atoms, are used in the process, the reaction is as follows:

(2)
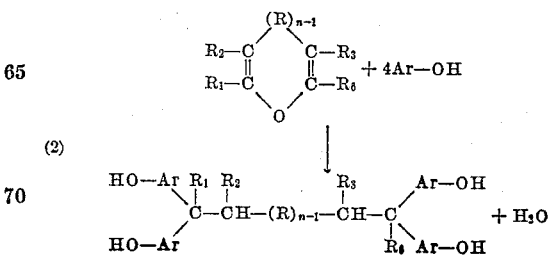

where the symbols have the previously defined significance. The products are tetrakis(hydroxyaryl)alkane compounds having gem-di(hydroxyaryl) substituents separated from each other by the same number of carbon atoms as are in the ring of the starting cyclic ether.

This same type of product is obtained with alpha,beta-monoethylenic cyclic ethers in which the saturated carbon atom to which the ether oxygen is attached is linked directly to a divalent atom of a non-metallic element of group VI of the Periodic Table of the Elements, particularly an atom of oxygen or a divalent atom of sulfur or selenium or tellurium which is directly joined to the carbon atom of an organic group. The equation for the reaction is

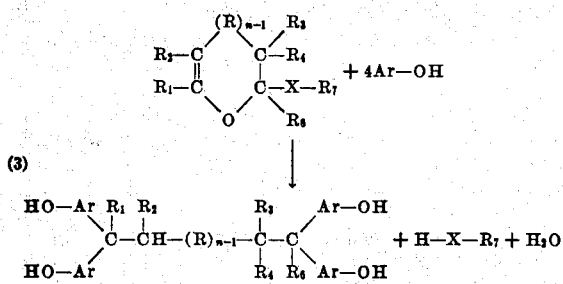

In this equation the previously defined symbols have the same significance and X represents an oxygen atom or divalent sulfur atom, while $R_7$ is an organic group linked through a carbon atom to X. Since the group $—X—R_7$ does not form a part of the final desired product, almost any organic group can be employed therein provided, of course, the compound containing such group is capable of independent existence. It is preferred when using alpha,beta-ethylenic cyclic ethers of this type to employ those in which $R_7$ is a non-reactive hydrocarbon group, a non-reactive substituted hydrocarbon group or an acyloxy group derived from a carboxylic acid to 1 to 18 carbon atoms which contains only monovalent and/or aromatic carbon-to-carbon bonds, such as one of the saturated aliphatic monocarboxylic acids or an aromatic carboxylic acid.

The foregoing equations relate to alpha,beta-ethylenic cyclic ethers which are free from reactive substituents, but this is not essential to the process of the invention since it has been found that corresponding ethers having substituents which react with the phenol can be successfully used as starting materials. It is only necessary to apply the phenol in a sufficiently larger amount to compensate for that which reacts with the substituent or substituents on the ring carbon atom or atoms of the starting alpha,beta-ethylenic cyclic ether. Reactions of this type are typified by the following equation in which an alpha,beta-monoethylenic cyclic ether having an aldehyde or a keto group attached to the saturated carbon atom, to which the ether oxygen atom is linked, is used as one illustration of a general class of carbonyl substituted ethers which can be reacted in the same way:

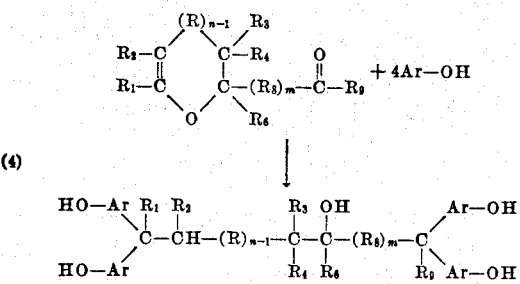

In this equation $R_8$ represents a non-reactive divalent hydrocarbon or nonreactive substituted divalent hydrocarbon radical, $R_9$ represents a hydrogen atom or a non-reactive hydrocarbon or non-reactive substituted hydrocarbon radical, and $m$ is an integer equal to zero or one, while the other symbols have the previously defined significance. The reaction takes place in the same way when one or more $$\overset{O}{\underset{\|}{-C-R_9}}$$

radicals replace one or more of $R_1$, $R_2$, $R_3$, $R_4$ or $R_5$ on the ether ring or occur as substituents on the divalent radical R.

In all of these formulae the indicated non-reactive monovalent hydrocarbon radicals or groups are preferably those which contain only substantially non-reactive carbon-to-carbon bonds, e. g. aromatic or univalent carbon-to-carbon bonds, and it is usually most advantageous to use compounds in which there are groups such as alkyl, aryl, alkaryl, aralkyl and cycloalkyl groups having 1 to 18 carbon atoms each. Representative hydrocarbon groups symbolized by $R_1$, $R_2$, $R_3$, $R_4$, $R_5$, $R_6$, $R_7$, and $R_9$ are, for example, phenyl, tolyl, xylyl, phenethyl, cyclohexyl, cyclopentyl, methylcyclopentyl, ethylcyclohexyl, heptyl, octyl, decyl, stearyl, phenylhexyl, tolylbutyl, and homologous and analogous groups; less desirable groups containing one or more non-aromatic unsaturated carbon-to-carbon bonds such as vinyl, allyl, methallyl, cyclohexenyl, crotyl, cinnamyl and the like, and most desirably the lower alkyl groups such as methyl, ethyl, propyl, butyl, pentyl, hexyl, and their branched-chain analogs. Likewise, the non-reactive divalent hydrocarbon radicals or groups represented by R and $R_8$ preferably contain only monovalent and/or aromatic carbon-to-carbon bonds. Alkylene, alkylidene, arylene, alkylenearyl, aralkylene, aralkylidene, cycloalkylene and cycloalkylidene radicals, preferably of 1 to 18 carbon atoms, are typical of these groups which can, for example, be methylene, ethylene, isopropylidene, hexylidene, octadecylidene, ortho-, meta- and para-phenylene, and the like. The ring radicals represented by R preferably have 1 to 6 carbon atoms, most preferably aliphatic carbon atoms, separating the two free bonds of the divalent radical. The indicated non-reactive substituted mono- and di-valent hydrocarbon radicals can be any of the foregoing hydrocarbon radicals in which one or more hydrogen atoms have been replaced by a substituent which is non-reactive under the reaction conditions. Substituents which have been found to be thus non-reactive are, for instance, the halogen atoms, especially chlorine, nitro groups, hydroxy groups, mercapto groups, sulfonic acid groups, and the like.

There are special advantages in carrying out the foregoing type of reactions with alpha,beta-ethylenic cyclic ethers having at least one hydrogen atom attached to each of the carbon atoms directly linked to the ether oxygen atom, and especially with ethers of this kind in which any saturated carbon linked to the ether oxygen is substituted by an $—X—R_7$ group, i. e. an ether, thioether, acyloxy or carbothiolic radical as described in connection with Equation 3, or a formyl group. Not only is the rate of reaction higher with these cyclic ethers than those having hydrocarbon or substituted hydroarbon groups substituted on the ring carbon aoms to which the ether oxygen atom is linked, but also this type of starting cyclic ether yields new poly(hydroxyaryl) compounds having especially advantageous properties, as will be pointed out more fully hereinafter. These desirable new products are the alpha,alpha-di(hydroxyaryl)-omega-hydroxy alkanes and alpha,alpha,omega,omega-tetrakis alkanes having at least five carbon atoms in the chain linking the alpha- and omega- positions.

Compounds of the dihydropyran series of compounds are especially advantageous starting materials for use in the new process not only because they are available in a variety of forms suitable for the synthesis of poly(hydroxyaryl)alkane compounds having structures which can be varied considerably in accordance with the requirements of the use for which they are intended, but also because of the excellent yields and conversions to the new products of the invention which they give. Dihydropyran-1,4 and its products of substitution on the 3-, 4- and/or 5- carbon atoms of the ring, particularly those thus substituted by alkyl, aryl, alkaryl or aralkyl groups of 1 to 12 carbon atoms, are especially useful for the production of alpha,alpha-di(hydroxyaryl)-omega-hydroxy pentanes in accordance with Equation 1. Examples of suitable substituted dihydropyrans of this type are: 3-methyldihydropyran-1,4; 4-isobutyldihydropyran-1,4; 5-isopropyldihydropyran-1,4; and the like.

Especially useful starting materials for the production of alpha,alpha,omega,omega-tetrakis(hydroxyaryl)-pentanes or the corresponding (hydrocarbyloxyaryl)pentanes are the 2-(3,4-dihydro-1,2-pyranyl)ethers and thioethers. Suitable compounds of this kind can be prepared conveniently as described and claimed in U. S. Patent 2,514,168, and it has been found that the present process can be carried out successfully with any of the 2-(3,4-dihydro-1,2-pyranyl)ethers, thioethers, esters and thioesters disclosed therein. Preferred compounds are those having a hydrocarbyloxy or hydrocarbylthio group in the 2-position on the 3,4-dihydro-1,2-pyran ring, particularly useful being compounds of this kind wherein the hydrocarbyl group is a non-reactive hydrocarbon group such as an alkyl, aryl, alkaryl, aralkyl or cycloalkyl group containing 1 to about 18 carbon atoms. Exemplary starting ethers are 2-(3,4-dihydro-1,2-pyranyl)ethyl ether, 2-(2-methyl-3,4-dihydro-1,2-pyranyl)methyl ether, 2-(5-methyl-3,4-dihydro-1,2-pyranyl)isopropyl ether, 2-(4-pentyl-3,4-dihydro-1,2-pyranyl)octadecyl ether, and 2-(3-phenyl-3,4-dihydro-1,2-pyranyl)tertiary butyl ether. The bis-2-(3,4-dihydro-1,2-pyranyl)ethers react in the new process to give two moles of gem-di(hydroxyaryl)alkane per mole of starting ether. Thus, with one mole of bis-2-(3,4-dihydro-1,2-pyranyl)ether itself, one obtains two moles of alpha,alpha,omega,omega - tetrakis(hydroxyaryl)pentane, and from one mole of bis-2-(4-phenyl-3,4-dihydro-1,2-pyranyl)ether the product is two moles of alpha,alpha,omega,omega-(hydroxyaryl)-gamma-phenyl pentane, for example. The thioethers corresponding to the foregoing ethers react with phenols in the same way in the new process, as do the corresponding esters, such, for instance, as 2-acetoxy-3,4-dihydro-1,2-pyran and 2-acetoxy-5-methyl-3,4-dihydro-1,2-pyran, etc.

U. S. Patent 2,479,284 describes a method of producing compounds in the dihydropyran-2-carboxaldehyde series of compounds which are useful in the production of hydroxy-substituted tetrakis(hydroxyaryl)alkanes in accordance with Equation 4. Typical useful compounds of this type are 3,4-dihydro-1,2-pyran-2-carboxaldehyde, 2,5-dimethyl-3,4-dihydro-1,2-pyran-2-carboxaldehyde, and the like. The related 2-ketoxy compounds such as 2,5-dimethyl-2-acetyl-3,4-dihydro-1,2-pyran, 2-acetyl-3,4-dihydro-1,2-pyran, and the like can be similarly used, as can the related compounds having aldehydic or keto-containing groups in other positions on the ring as, for instance, 2,5-dimethyl-3-acetyl-3,4-dihydro-1,2-pyran or 2,5-dimethyl-3,4-dihydro-1,2-pyran-4-carboxaldehyde, etc.

Cyclic alpha,beta-ethylenic ethers other than the foregoing six-membered ring compounds can be successfully used in the new process. The Journal of the American Chemical Society, vol. 73, pages 913–914 (1951), and vol. 76, pages 1173-1174 (1954), describes a number of alpha,beta-monoethylenic furan compounds such as 3-methyl-2,3-dihydrofuran which are useful in the production of hydroxy-substituted gem-di(hydroxyaryl)butanes according to the invention. Furan and 2-methyl furan are typical of the five-membered ring cyclic diethylenic compounds which can be used in the process to produce tetrakis(hydroxyaryl)alkanes. Cyclic ethers with more than five carbon atoms in the ring are especially useful for the preparation of gem-di(hydroxyaryl)alkanes having hydroxyl or gem-di(hydroxyaryl) as substituents which are further removed from the first said gem-di(hydroxyaryl) groups than can be obtained with pyran compounds.

While cyclic ethers form an especially preferred class of starting alpha,beta-ethylenic ethers for use in the new process because of the smoothness and efficiency with which they can be reacted with phenols by the new method and because of the desirable properties of the substituted gem-di(hydroxyaryl)alkanes which are obtained, this new process can also be carried out successfully with open chain alpha,beta-ethylenic ethers. The reaction with the open chain ethers takes place in accordance with the previously given equations except that, since there are separate groups linked to the ether oxygen atom, two moles of product will be formed instead of one. With symmetrical ethers, for example, these two products will be identical, namely, a gem-di(hydroxyaryl)alkane having no substituents other than those present in the starting ether. Thus, divinyl ether gives bis-di(hydroxyaryl)ethane as the sole product, dipropenyl ether gives alpha,alpha-di(hydroxyaryl)propanes and diisopropenyl ether gives beta,beta-di(hydroxyaryl)propanes. Unsymmetrical di-(alpha,beta-ethylenic)-ethers give two different gem-di(hydroxyaryl)alkanes and, hence, are usually less desirable starting materials because the products have to be separated unless mixed products are useful in the application to which the resulting gem-di(hydroxyaryl)alkanes are to be employed. For instance, from vinyl propenyl ether and a phenol one obtains both a bis-di(hydroxyaryl)ethane and an alpha,alpha-di(hydroxyaryl)propane. Similarly, single products or mixtures of gem-di(hydroxyaryl)alkanes are obtained when an open chain alpha,beta-monoethylenic ether having the saturated carbon atom directly linked to the ether oxygen atom substituted by an acyloxy-, alkoxy- or other type of the previously mentioned —X—R7 group is used as starting material. Illustrative of the reactions of ethers of this type are the production of bis-di(hydroxyaryl)ethane as the sole hydroxyaryl alkane product from alpha-ethoxyethyl vinyl ether with ethanol as a by-product of the reaction, and the production of a mixture of about equal amounts of bis-di(hydroxyaryl)ethane and alpha,alpha-di(hydroxyaryl)propane from alpha-methoxypropyl vinyl ether, the by-product being methanol in this case.

Unsymmetrical open chain alpha,beta-monoethylenic ethers having only hydrogen atoms and/or non-reactive hydrocarbon groups in the molecule produce gem-di(hydroxyaryl)alkanes and a hydroxy hydrocarbon, e. g. an alcohol or a phenol, as the products. For example, from vinyl ethyl ether and phenol bis-di(para-hydroxyphenyl)-ethane and ethanol are the products, while isopropenyl amyl ether gives beta,beta-di(para-hydroxyphenyl)propane and pentanol under the same conditions, and styryl methyl ether gives alpha,alpha-di(para-hydroxyphenyl)-beta-phenyl ethane and methanol. Aryl ethers form the corresponding phenols in the process, and if these have a replaceable hydrogen atom on the ring, they often undergo further reaction with the starting ether. Thus, phenyl vinyl ether reacted with a large excess of meta-cresol yields chiefly bis - di(ortho - methyl - para - hydroxyphenyl)ethane and phenol but, especially when smaller proportions of the meta-cresol are employed, will also yield some alpha - (ortho - methyl - para - hydroxyphenyl) - alpha-(para-hydroxyphenyl)ethane. In order to avoid formation of such mixed hydroxyaryl alkane products, it is preferred to employ for the reaction phenols which correspond to the aryl group of the aryl ether used as starting material.

Polyethers can be used instead of monoethers in the process. For instance, with the dipropenyl ether of ethylene glycol one obtains as products two moles of alpha,alpha-di(hydroxyaryl)alkane per mole of ethylene glycol produced. When employing 2,6-divinyloxytetrahydropyran as the starting ether, the products are bis-di(hydroxyaryl)ethane and alpha,alpha,omega,omega-tetrakis(hydroxyaryl)pentane.

The process can be carried out in exactly the same way to obtain the same general type of products using any mono-, di- and poly-cyclic phenol having a replaceable hydrogen atom on a ring to which a phenolic hydroxyl group is directly linked. These phenols may or may not be substituted by non-reactive hydrocarbon or non-reactive substituted hydrocarbon groups of the previously indicated types, or by non-reactive substituents such as halogen atoms, nitro or hydrocarbyloxy groups and the like, or other groups which do not interfere with the reaction. Also, instead of monohydroxy phenols one can use polyhydroxy phenols, it being only necessary that the phenolic compound contain a replaceable hydrogen linked to the aromatic ring to which the phenolic hydroxyl group is attached.

Representative examples of mono-hydroxy phenols which have been found to be useful in the new process are: phenol, ortho-, meta- and para-cresols, the xylenols, the tri- and tetra-methyl phenols, especially 2,3,5,6-tetramethyl phenol, 2,6-diisopropyl phenol, ortho-tert-butyl-meta-cresol, thymol, carvacrol, 2,6-dimethyl-4-tert-butyl phenol, p-octyl phenol, dodecyl phenol, alpha-naphthol, ortho-phenyl phenol, anthranol, phenanthrol, and substitution products thereof such as para-chlorophenol, 2,4-dichlorophenol, 2,4,5-trichlorophenol, the 2- and 3-methyl-4-chlorophenols, saligenin, 2-chloro-6-hydroxybenzyl alcohol, and 4-chloronaphthol. Suitable polyhydroxy phenols are, for instance, resorcinol, hydroquinone, orcinol, 2,6-dihydroxy-toluene, 3,5-dihydroxy-ortho-xylene, phloroglucinol and substitution products thereof. The phenolic compounds which have been found most advantageous in the new reaction are those having a replaceable hydrogen atom in the para position to the phenolic hydroxyl. Apparently, in forming its carbon-to-carbon bond with the alpha,beta-ethylenic ether, the phenol will preferentially attach itself at the position para to the phenolic hydroxyl group unless this position is blocked, in which case attachment at an ortho position will preferentially occur. Phenols which have all the ortho and para positions occupied are less preferred starting materials because they require more drastic conditions of reaction and tend to result in great by-product formation.

For effective reaction according to the invention, at least 0.2 mole of an acid should be used per mole of alpha,beta-ethylenic ether employed. The preferred acids are the relatively strong acids, i. e. those having an ionization constant for the first hydrogen greater than $1.86 \times 10^{-5}$ at 25° C. Instead of the acids themselves, a suitable acid-reacting salt, or a material which will react under the conditions of the process to form in situ an acid-reacting material, can be used. Suitable acid-reacting materials which may be employed as the catalyst include, for example, mineral acids such as HCl, $H_2SO_4$, HBr, HI, $H_3PO_4$, $H_4P_2O_7$, $NHO_3$, $H_2SeO_4$, $H_2SO_3$, and the like; acid-reacting salts such as $NaHSO_4$, $NaH_2PO_4$, $KH_2PO_4$, $ZnCl_2$, $MgCl_2$, $ZnSO_4$, $FeCl_3$, $Al_2(SO_4)_3$, and the like. There also may be employed compounds which form mineral acids with water, such as $SO_2Cl_2$, $SOCl_3$, $N_2O_3$, $PCl_3$, $PCl_5$, and the like. As the acidic catalyst there also may be employed suitable organic acids, particularly halogenated carboxylic acids such as trichloroacetic acid or sufonic acids such as para-toluene sulfonic acid and the like. The acid or equivalent acid-reacting material chosen is preferably used in an amount betwen about 0.25 and about 1 mole per mole of alpha,beta-ethylenic ether initially present.

The reaction is preferably carried out by reaction in the liquid phase under substantially anhydrous conditions. Limited amounts of water can be present, however, without preventing the reaction and in some cases, as shown by Equations 2 and 3, water will be formed in the process. Where at least one of the reactants is a liquid which is miscible with the other reactant, the process can be carried out without an added solvent, but in other cases it is desirable to use an organic solvent as the reaction medium. Hydrocarbons such as benzene, toluene, etc., halogenated hydrocarbons, for instance, carbon tetrachloride, chloroform or the like, are examples of suitable solvents. With liquid phenols, an excess can be used to provide an especially advantageous medium for carrying out the reaction.

The phenol and alpha,beta-ethylenic ether can be used with either reactant in excess over the stoichiometric requirement for the reaction, but it has generally been found preferable to use the phenol in excess. Thus, while the process can be carried out with mole ratios of phenol to ether as low as one-half of the stoichiometric ratio or less, it is preferred to use at least stoichiometric proportions, and most preferably ratios of phenol from 2 to 10 times the stoichiometric ratio are employed.

The reaction takes place on mixing the reactants at ordinary temperature and is usually strongly exothermic so that considerable temperature rise may occur. The reaction is generally quite rapid and may be completed in from 30 minutes to 4 hours. External heating can be used to promote more rapid reaction when desired. Temperatures between about 20° C. and about 100° C. are ordinarily satisfactory, but higher temperatures can be employed.

It has been found that the reaction is activated by small amounts of mercaptan compounds, particularly alkyl mercaptans such as methyl mercaptan, ethyl mercaptan, propyl and isopropyl mercaptans, the butyl mercaptans, phenyl mercaptans, and the like. These activators are especially useful when reacting phenols with alpha,beta-ethylenic eters in which one or both of the carbon atoms linked to the ether oxygen atom are directly attached to two or more carbon atoms. Such alpha,beta-ethylenic ethers are somewhat less reactive than the previously described preferred starting ethers which have at least one hydrogen atom linked to each of the carbon atoms to which the ether oxygen atom is joined, and the addition of about 0.01 to about 0.2 mole of mercaptan per mole of ether is helpful in speeding up the reaction in such cases. The same amounts of mercaptan activators can also be used with the more preferred starting alpha,beta-ethylenic ethers, however, to still further shorten the reaction time.

Ordinary, superatmospheric or reduced pressures can be used in carrying out the reaction which can be conducted batchwise or continuously in any suitable type of apparatus. It is sometimes desirable to remove the water and/or other by-products of the reaction as they are formed and this can conveniently be accomplished by carrying out the reaction under conditions at which such materials distill off. Any reactant simultaneously removed can be separated from the distillate and recycled to the process.

After completion of the reaction the acid catalyst may be removed from the mixture, by distillation in the case of volatile acids, or by neutralization with a basic agent. For instance, sulfuric acid can be neutralized with calcium carbonate. The desired gem-di(hydroxyaryl)alkane compound is then recovered from the reaction mixture in any suitable manner. Most of the products can be distilled under vacuum without decomposition but in other cases it may be more advantageous to recover the product by crystallization from a solvent. In many instances it is unnecessary to recover the product in pure form since technical grades are generally satisfactory for most applications.

The poly(hydroxyaryl)alkane compounds having gem-di(hydroxyaryl) groups which are the products of the new process are liquid to solid compounds which have many valuable uses. They are generally insoluble in water but some of them can be dissolved in aqueous alkali solutions, and most are soluble in varying degrees in organic solvents such as hydrocarbons, ketones, chloroform, etc. They are useful intermediates in the synthesis of other compounds, for instance, by etherification and/or esterification of the free hydroxyl groups. They can be used in the manufacture of surface-active agents and other useful products.

In one of its aspects the invention relates particularly to the preparation of novel poly(hydroxyaryl)-hydroxyalkanes having the hydroxy group linked to a carbon atom of the alkane chain which is intermediate between two gem-di(hydroxyaryl) substituted chain carbon atoms which are separated from each other by at least four carbon atoms. An especially preferred sub group of the new compounds of this class are the alpha,alpha,-omega, omega-tetrakis(hydroxyaryl)monohydroxy-substituted alkanes having 6 to 12 carbon atoms in the alkane chain. These novel compounds can be produced by reacting a phenolic compound with alpha,beta-ethylenic cyclic ether having an aldehyde or keto group attached to the saturated carbon atom to which the ether oxygen is linked, as shown in Equation 4. In the preparation of the preferred alpha,alpha,omega,omega - tetrakis(hydroxyaryl)hydroxy alkanes, cyclic ethers having one hydrogen atom attached to each of the carbon atoms to which the ether oxygen atom is linked are used as the starting material. The new products can be synthesized by other methods but, as far as known, these are now more difficult and expensive than the method of the present invention.

Typical of the new products prepared by the present method are:

A. Alpha,alpha,omega,omega-tetrakis(hydroxyaryl)-hydroxy-alkanes, such as—
  1,1,6,6 - tetrakis - (4' - hydroxyphenyl) - 2 - hydroxyhexane from phenol and 3,4 - dihydro - 1,2-pyran-2-carboxaldehyde,
  1,1,6,6 - tetrakis - (2' - methyl - 4' - hydroxyphenyl) - 2 - hydroxyhexane from meta - cresol and 3,4 - dihydro - 1,2 - pyran - 2 - carboxaldehyde,
  1,1,6,6 - tetrakis - (4' - hydroxyphenyl) - 2 - hydroxy - 5 - methylhexane from phenol and 5-methyl - 3,4 - dihydro - 1,2 - pyran - 2 - carboxaldehyde,
  1,1,6,6 - tetrakis - (2',3',5',6' - tetramethyl - 4' - hydroxyphenyl) - 2 - hydroxy - 4 - pentylhexane from 2,3,5,6 - tetramethylphenol and 4 - pentyl-3,4 - dihydro - 1,2 - pyran - 2 - carboxaldehyde,
  1,1,6,6 - tetrakis - (4' - hydroxyphenyl) - 2 - hydroxy - 3,4 - dimethylhexane from phenol and 3,4 - dimethyl - 3,4 - dihydro - 1,2 - pyran - 2-carboxaldehyde,
  1,1,6,6 - tetrakis - (4' - hydroxyphenyl) - 2 - hydroxy - 3,4 - diphenylhexane from phenol and 3,4 - diphenyl - 3,4 - dihydro - 1,2 - pyran - 2-carboxaldehyde,
  1,1,7,7 - tetrakis - (4' - hydroxyphenyl) - 3 - hydroxyheptane from phenol and 2 - (3,4 - dihydro-1,2-pyranyl)-acetaldehyde,
  1,1,8,8 - tetrakis - (3' - isopropyl - 4' - hydroxyphenyl) - 4 - hydroxyoctane from 2 - isopropylphenol and 2 - (3,4 - dihydro - 1,2 - pyranyl)-propan-3-al,
  1,1,12,12 - tetrakis - (4' - hydroxyphenyl) - 6 - hydroxydodecane from phenol and 2 - (3,4 - dihydro-1,2-pyranyl)-pentan-5-al.

B. Tetra-(hydroxyaryl)-hydroxy alkanes having gem-di(hydroxyaryl) groups in non-terminal positions, such as—
  1,1,6,6 - tetra - (4' - hydroxyphenyl) - 2 - methyl-2 - hydroxyheptane from phenol and 2,6 - dimethyl - 3,4 - dihydro - 1,2 - pyran - 2 - carboxaldehyde,
  1,1,6,6 - tetra - (2' - methyl - 4' - hydroxyphenyl)-4 - ethyl - 4 - hydroxyoctane from meta - cresol and 2,6 - diethyl - 3,4 - dihydro - 1,2 - pyran - 2-carboxaldehyde,
  1,1,6,6 - tetra - (4' - hydroxyphenyl) - 2 - hydroxyheptane from phenol and 6 - methyl - 3,4 - dihydro - 1,2 - pyran - 2 - carboxaldehyde,
  1,1,6,6 - tetra - (4' - hydroxyphenyl) - 2 - hydroxy-2,3 - dimethyloctane from phenol and 2,3 - dimethyl - 6 - ethyl - 3,4 - dihydro - 1,2 - pyran-2-carboxaldehyde,
  2,2,7,7 - tetra - (4' - hydroxyphenyl) - 3 - hydroxyoctane from phenol and 6 - methyl - 2 - aceto-3,4-dihydro-1,2-pyran.

These and related tetra-(hydroxyaryl)alkanes having gem-di(hydroxyaryl) groups separated from each other by a chain of at least five carbon atoms carrying a hydroxy group have unexpected and desirable properties which make them highly valuable compounds. The unique combination of the hydroxyl groups in an intermediate position on the long hydroxyaryl-substituted chain apparently contributes physical and chemical characteristics which give these new compounds enhanced value in several fields of utility. They have advantageous antioxidant properties which make them useful additives for gasoline, lubricating oils, etc. They are especially useful in the preparation of polyepoxide compounds by reaction with epoxy compounds. In this application they yield resinous products of superior properties due to their great cross-linking ability resulting from the presence of the aliphatic chain hydroxyl group in an intermediate position between four hydroxyaryl groups. Thus, it has been found that the new compounds react with glycerine epichlorohydrin and caustic to form resins which cure readily to products of outstanding hot hardness and flexural strength, and especially useful in the preparation of laminates of various kinds. They have been used to prepare glass cloth laminates, for example, having exceptionally high Barcol hardness at temperatures of the order of 150° C. These resins have also been used successfully in the production of castings using piperidine, for instance, as the curing agent. The new compounds are also useful in preparing surface-active agents, especially when esterified at the aliphatic hydroxyl group, and can be applied in other ways.

Typical of the production of other types of gem-di(hydroxyaryl)alkanes according to the invention are:

C. The production of tetra-(hydroxyaryl)alkanes without hydroxy groups on the alkane chain, for example:
  1,1,5,5 - tetrakis - (4' - hydroxyphenyl) - 3 - methylpentane from 2 - methoxy - 4 - methyl - 3,4-dihydro - 1,2 - pyran and phenol, methanol being the byproduct,
  1,1,5,5 - tetrakis - (2' - methyl - 4' - hydroxyphenyl) - hexane from 2 - isobutoxy - 6 - methyl-3,4 - dihydro - 1,2 - pyran and meta - cresol, isobutanol being the by-product,
  1,1,5,5 - tetrakis - (4' - hydroxyphenyl) - pentane, together with an equal molecular amount of 1,1-bis(4' - hydroxyphenyl) - ethane from 2 - vinoxy-3,4-dihydro-1,2-pyran and phenol,
  1,1,5,5 - tetrakis - (4' - hydroxyphenyl) - 3 - phenylpentane from 2 - acetoxy - 3 - phenyl - 3,4-dihydro - 1,2 - pyran and phenol, acetic acid being the by-product,
  1,1,5,5 - tetrakis - (2',6' - dimethyl - 4' - hydroxyphenyl) - 2 - methylpentane from 2 - (5 - methyl-3,4 - dihydro - 1,2 - pyranyl) - phenyl sulfide and 2,6 - dimethylphenol, phenyl mercaptan being the by-product,
  1,1,4,4 - tetrakis - (4' - hydroxyphenyl) - 2 - methylbutane from 2 - methylfuran and phenol.

D. The production of gem-di(hydroxyaryl)hydroxyalkane compounds, such as:

1,1 - di - (4' - hydroxyphenyl) - 2 - methyl - 5-phenyl - 5 - hydroxyhexane from 2,5 - dimethyl-2 - phenyl - 3,4 - dihydro - 1,2 - pyran and phenol, 6,6 - di(2' - methyl - 4' - hydroxyphenyl) - 2 - methyl - 2 - hydroxyhexanoic acid from 2 - methyl-3,4 - dihydro - 1,2 - pyran - 2 - carboxylic acid and meta-cresol, 1,1 - di(4' - hydroxyphenyl) - 5 - hydroxynonane from 2 - n - butyl - 3,4 - dihydro - 1,2 - pyran and phenol, 1,1 - di(4' - hydroxyphenyl) - 5,7,7 - trimethyl - 5-hydroxyoctane from 2 - methyl - 2 - neopentyl-2,4 - dihydro - 1,2 - pyran and phenol, 2,2 - di(3' - isopropyl - 4' - hydroxyphenyl) - 5-phenyl - 5 - hydroxyheptane from 2,6 - dimethyl-2 - phenyl - 3,4 - dihydro - 1,2 - pyran and 2 - isopropylphenol, 1,1 - di(4' - hydroxyphenyl) - 4 - hydroxybutane from dihydrofuran and phenol.

E. The production of gem-di(hydroxyaryl)alkane compounds without hydroxy groups on the alkane chain, such as:

2,2 - di(4' - hydroxyphenyl)propane from methyl isopropenyl ether and phenol, methanol being the by-product, 2,2 - di(4' - hydroxyphenyl)propane from isopropenyl acetate and phenol, acetic acid being the by-product, 1,1 - di(2' - methyl - 4' - hydroxyphenyl)butane from 1-butenyl ethyl ether and meta-cresol, with formation of ethanol as by-product, 4,4 - di(4' - hydroxyphenyl)heptane from phenol and ethyl 4 - hept - 3 - enyl ether, ethanol being obtained as by-product, 1,1 - di(2',3',5',6' - tetramethyl - 4' - hydroxyphenyl-hexane from durenol and methyl 1-hexenyl ether, with simultaneous production of methanol.

The following examples show in more detail how the new process can be carried out for the production of these and other valuable gem-di(hydroxyaryl)alkane compounds.

*Example I*

1,1,6,6 - tetrakis-(4'-hydroxyphenyl)-2-hydroxyhexane was produced by adding 3,4-dihydro-1,2-pyran-2-carboxaldehyde to ten molar equivalents of phenol saturated with dry HCl at 40°–45° C. The reaction was strongly exothermic and quite rapid. Excess phenol, HCl and water were removed by distillation to a final temperature of 185° C. at 1 mm. The weight of the light-red product corresponded to slightly more than theory for 1,1,6,6-tetrakis-(4'-hydroxyphenyl)-2-hydroxyhexane. The product had a hydroxyl value 0.86 eq./100 g. compared with the theoretical value 0.852 eq./100 g. calculated for $C_{30}H_{30}O_5$. The solid product was soluble in 10% aqueous NaOH, and 20% w. in epichlorohydrin. By substituting alpha-naphthol for the phenol in this reaction 1,1,6,6-tetrakis-(4'-hydroxynaphthyl) - 2 - hydroxyhexane is obtained as the product. In the same way 1,1,6,6-tetrakis-(2' - methyl-4'-hydroxyphenyl)-2-hydroxy-5-methylhexane is produced by reacting meta-cresol with 5-methyl-3,4-dihydro-1,2-pyran - 2 - carboxaldehyde, and 1,1,6,6-tetrakis - (2'-chloro-4'-hydroxyphenyl)-2-hydroxyhexane is produced from 3,4-dihydro-1,2-pyran-2-carboxaldehyde and meta-chlorophenol.

*Example II*

1,1,5,5-tetrakis - (4' - hydroxyphenyl)pentane was produced by reacting 2-methoxydihydropyran with phenol using ten moles of phenol per mol of the ether, the phenol being saturated with the HCl catalyst. After reaction for 165 minutes, the mixture was distilled to remove methanol, water, HCl and excess phenol, and a light-yellow solid product was obtained which was soluble in 10% sodium hydroxide and in 20% epichlorohydrin solution. The yield was 93% of the theoretical. Analysis showed 14.5% oxygen and a hydroxyl value of 0.908 eq./100 g. compared with theoretical values calculated for $C_{29}H_{38}O_4$ of 15% oxygen and 0.89 hydroxyl value. The same product is obtained by reacting in the same way 5-methoxy-4-pentenal with phenol.

Under the same conditions 2-isobutoxy-6-methyl-3,4-dihydro-1,2-pyran reacts with meta-cresol to produce 1,1,5,5 - tetrakis-(2'-methyl-4'-hydroxyphenyl)hexane in good yield, together with isobutyl alcohol.

*Example III*

By the method of Example II, 1,1,4,4-tetrakis-(4'-hydroxyphenyl)-2-ethylbutane is produced from 2-ethylfuran and phenol.

*Example IV*

1,1-bis(4'-hydroxyphenyl)-5-hydroxypentane was prepared by reacting 6 moles of phenol with one mole of dihydropyran. The phenol was saturated with HCl before carrying out the reaction at 40° C. The reaction was complete in 120 minutes, and a very pale yellow bottoms product was obtained in 92% conversion after distilling off the excess phenol and the hydrogen chloride. Analysis of the product showed hydroxyl value of 1.101 eq./100 g. (theory, 1.101) and less than 0.02% Cl (theory, none).

In the same way, 1,1-di(4'-hydroxyphenyl)-2-methyl-5-phenyl-5-hydroxyhexane is produced from an excess of phenol and 2,5-dimethyl-2-phenyl-3,4-dihydro - 1,2-pyran.

*Example V*

Using the procedure of Example IV, 6,6-di(2'-methyl-4-hydroxyphenyl)-2-methyl - 2 - hydroxyhexanoic acid is produced from meta-cresol and 2-methyl-3,4-dihydro-1,2-pyran-2-carboxylic acid.

In the same way, 1,1-di(4'-hydroxyphenyl)-5,7,7-trimethyl-5-hydroxyoctane is obtained when using an excess of phenol with 2-methyl-2-neopentyl-3,4-dihydro-1,2-pyran.

*Example VI*

Reacting six moles of phenol saturated with dry hydrogen chloride with one mole of methyl isopropenyl ether at about 35°–45° C. results in a good yield of 2,2-di(4'-hydroxyphenyl)propane, melting, after purification, at 150°–151° C. Methanol is recovered as a by-product.

The same product is obtained by substituting isopropenyl acetate for the methyl isopropenyl ether in the foregoing reaction. The by-product in this case was acetic acid.

We claim as our invention:

1. A process of producing gem-di(hydroxyaryl)alkanes which comprises reacting at least two moles of a phenol having a replaceable hydrogen atom attached to an aromatic nucleus to which a phenolic hydroxyl group is linked with one mole of an alpha, beta-ethylenic ether in the presence of 0.2 to about 1 mole of an acid-reacting agent per mole of said ether as the sole reactants.

2. A process of producing gem-di(hydroxyaryl)alkanes which comprises reacting at least two moles of a monohydroxyphenol of the benzene series having a hydrogen atom in para-position to the hydroxyl group with one mole of an alpha, beta-ethylenic ether having a hydrogen atom attached to each of the carbon atoms to which the ether oxygen atom is directly linked in the presence of 0.2 to about 1 mole of a strong acid per mole of said ether as the sole reactants.

3. A process of producing gem-di(hydroxyaryl)alkanes which comprises reacting at least two moles of a phenol having a replaceable hydrogen atom attached to an aromatic nucleus to which a phenolic hydroxyl group is linked with one mole of an alpha, beta-ethylenic cyclic ether having at least four carbon atoms in the ether ring in the presence of 0.2 to about 1 mole of a strong acid per mole of said ether as the sole reactants.

4. A process of producing gem-di(hydroxyaryl)alkanes which comprises reacting at least two moles of a monohydroxyphenol having a replaceable hydrogen atom attached to the aromatic nucleus to which the hydroxyl group is linked with one mole of a cyclic ether wherein each of the carbon atoms directly linked to the ether oxygen atom is joined by an ethylenic double bond to another ring carbon atom in the presence of 0.2 to about 1 mole of a strong acid per mole of said ether as the sole reactants.

5. A process of producing gem-di(hydroxyaryl)alkanes which comprises reacting at least two moles of a monohydroxyphenol having a replaceable hydrogen atom attached to the aromatic nucleus to which the hydroxyl group is linked with one mole of an alpha, beta-ethylenic ether of the pyran series of compounds in the presence of 0.2 to about 1 mole of a strong acid per mole of said ether as the sole reactants.

6. A process of producing a gem-di(hydroxyaryl)hydroxyalkane which comprises reacting at least two moles of a phenol having a replaceable hydrogen atom attached to an aromatic nucleus to which a phenolic hydroxyl group is linked with one mole of a 3,4-dihydropyran having attached to the ring carbon atoms members of the group consisting of the hydrogen atom and hydrocarbon radicals of 1 to 18 carbon atoms in the presence of 0.2 to about 1 mole of a strong acid per mole of said ether as the sole reactants.

7. A process of producing 1,1-bis(4'-hydroxyphenyl)-5-hydroxypentane which comprises reacting two moles of phenol with one mole of 3,4-dihydropyran in the presence of about 0.25 to 1 mole of a strong acid per mole of 3,4-dihydropyran as the sole reactants.

8. A process of producing a tetra-(hydroxyaryl)alkane which comprises reacting four moles of a phenol having a replaceable hydrogen atom attached to an aromatic nucleus to which a phenolic hydroxyl group is linked with one mole of a 3,4-dihydro-1,2-pyran having an extranuclear organic group bonded to the carbon atom in the 2-position of the ring through a divalent atom of the group consisting of oxygen and sulfur in the presence of about 0.25 to about 1 mole of a strong acid per mole of said 3,4-dihydro-1,2-pyran compound as the sole reactants.

9. A process of producing a poly(hydroxyaryl)hydroxyalkane having a hydroxyl group on the aliphatic chain in intermediate position between two gem-di(hydroxyaryl) substituted carbon atoms of that chain which comprises reacting four moles of a phenol having a replaceable hydrogen atom attached to an aromatic nucleus to which a phenolic hydroxyl group is linked with one mole of a 3,4-dihydro-1,2-pyran having an extranuclear mono-oxo-substituted hydrocarbon group of 1 to 18 carbon atoms directly bonded to the carbon atom in the 2-position of the ring in the presence of about 0.24 to about 1 mole of a strong acid per mole of said 3,4-dihydro-1,2-pyran compound as the sole reactants.

10. A process of producing an alpha,alpha,omega, omega-tetra-(p-hydroxyphenyl)hydroxyalkane which comprises reacting four moles of phenol with one mole of a 3,4-dihydro-1,2-pyran-2-carboxaldehyde having an atom of hydrogen attached to each of the carbon atoms to which the ring oxygen atom is linked and having each of the other ring carbon atoms directly joined to a member of the group consisting of the hydrogen atom and the hydrocarbon radicals of 1 to 18 carbon atoms in the presence of about 0.25 to about 1 mole of a strong acid per mole of said 3,4-dihydro-1,2-pyran compound as the sole reactants.

11. A process of producing gem-di(hydroxyaryl)alkanes which comprises reacting at least two moles of a phenol having a replaceable hydrogen atom attached to an aromatic nucleus to which a phenolic hydroxyl group is linked with one mole of an alpha, beta-ethylenic open chain ether in the presence of 0.2 to about 1 mol of a strong acid per mole of said ether as the role reactants.

12. A process of producing a gem-di(hydroxyaryl) alkane and an alcohol which comprises reacting two moles of a monohydroxyphenol of the benzene series having a replaceable hydrogen atom on the ring with one mole of an aliphatic ether having the ether oxygen atom directly attached to an alkyl radical of 1 to 18 carbon atoms and to a 1-alkenyl radical of 2 to 18 carbon atoms in the presence of 0.2 to about 1 mole of a strong acid per mole of said ether as the sole reactants.

13. A tetra-(hydroxyaryl)-hydroxy-aliphatic saturated hydrocarbon having the hydroxyl group linked to a carbon atom of the alkane chain which is in an intermediate position between two gem-di(hydroxyaryl)-substituted carbon atoms of the chain which are separated by at least four carbon atoms.

14. An alpha,alpha,omega,omega - tetrakis - (hydroxyaryl)hydroxyalkane having at least six carbon atoms in the alkane chain to which the hydroxyaryl groups are attached.

15. 1,1,6,6-tetrakis-(hydroxyaryl)-2-hydroxyhexanes.

16. 1,1,6,6 - tetrakis - (4'-hydroxyphenyl)-2-hydroxyhexane.

References Cited in the file of this patent

UNITED STATES PATENTS

| | | |
|---|---|---|
| 2,000,252 | Reppe et al. | May 7, 1935 |
| 2,193,327 | Blass et al. | Mar. 12, 1940 |
| 2,333,548 | Niederl | Nov. 2, 1943 |
| 2,515,909 | Stevens et al. | July 18, 1950 |
| 2,550,637 | Copenhaver | Apr. 24, 1951 |
| 2,574,444 | Whetstone | Nov. 6, 1951 |
| 2,619,491 | Smith | Nov. 25, 1952 |

FOREIGN PATENTS

| | | |
|---|---|---|
| 537,976 | Great Britain | July 16, 1941 |

OTHER REFERENCES

Woods et al.: 69 Jour. Amer. Chem. Soc., 2246, 3157 (Sept. 1947), 2 pages.

Parham et al.: 70 Jour. Amer. Chem. Soc. 4187–89 (Dec. 1948), 3 pages.